United States Patent
Rich et al.

(10) Patent No.: US 6,929,312 B2
(45) Date of Patent: Aug. 16, 2005

(54) DUCT/FRAME ELEMENT ASSEMBLAGES AND METHODS OF ASSEMBLING DUCTS AND FRAME ELEMENTS

(75) Inventors: Jonathan E Rich, Clinton Township, MI (US); Armando J. Ybarra, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/688,419

(22) Filed: Oct. 17, 2003

(65) Prior Publication Data

US 2005/0082872 A1 Apr. 21, 2005

(51) Int. Cl.$^7$ ............................................. B62D 25/04
(52) U.S. Cl. ........................... 296/187.02; 296/193.06; 296/208
(58) Field of Search ....................... 296/187.02, 190.09, 296/193.02, 193.06, 70, 208

(56) References Cited

U.S. PATENT DOCUMENTS

| | | | |
|---|---|---|---|
| 5,358,300 A | | 10/1994 | Gray |
| 5,575,526 A | * | 11/1996 | Wycech ...................... 296/205 |
| 5,591,078 A | | 1/1997 | Filion |
| 5,902,181 A | | 5/1999 | Bain |
| 6,045,444 A | | 4/2000 | Zima |
| 6,048,263 A | | 4/2000 | Uchida |
| 6,053,215 A | | 4/2000 | Sadr |
| 6,135,542 A | * | 10/2000 | Emmelmann et al. ...... 296/205 |
| 6,186,885 B1 | | 2/2001 | Ahn |
| 6,199,940 B1 | * | 3/2001 | Hopton et al. ......... 296/187.02 |
| 6,273,495 B1 | | 8/2001 | Haba |
| 6,322,136 B2 | | 11/2001 | Boyce |
| 6,378,933 B1 | * | 4/2002 | Schoen et al. ......... 296/187.02 |
| 6,378,934 B1 | | 4/2002 | Palazzolo |
| 6,398,294 B1 | | 6/2002 | Bollweg |
| 6,409,947 B1 | | 6/2002 | Wandyez |
| 6,457,767 B1 | * | 10/2002 | Omarain ...................... 296/208 |
| 6,474,723 B2 | * | 11/2002 | Czaplicki et al. ....... 296/187.02 |
| 6,668,457 B1 | * | 12/2003 | Czaplicki ................... 29/897.1 |
| 2002/0173264 A1 | | 11/2002 | Ottman |
| 2004/0135400 A1 | * | 7/2004 | Matsuzaki et al. ..... 296/193.02 |

FOREIGN PATENT DOCUMENTS

| | | | |
|---|---|---|---|
| DE | 4232847 | * | 3/1994 |
| FR | 2789043 | * | 8/2000 |

* cited by examiner

Primary Examiner—Dennis H. Pedder
(74) Attorney, Agent, or Firm—Laura C. Hargitt

(57) ABSTRACT

An HVAC duct is mounted within a pillar providing a frame element of a framing structure defining a passenger compartment of a vehicle such as a van, an SUV or a station wagon. The HVAC duct is stabilized within the pillar by a layer of structural foam or other cellular structure which is adhered to the interior surface of a wall of the pillar, for example, by heat expanded epoxy adhesive. In a method of assembling the HVAC duct and pillar, the duct is mounted on an interior wall portion of the pillar prior to enclosing the duct in the pillar by welding an exterior wall portion of the pillar to the interior wall portion of the pillar. Upon heating the pillar to bake the frame assembly after painting the frame assembly, the heat expandable epoxy expands and adheres to interior surfaces of the pillar walls. The resulting structure reduces structural intrusion into the passenger compartment by the duct and pillar assemblage, while increasing the cross-sectional area of the pillar. Alternatively, an expandable epoxy such as polyurethane foam is used, which expands between the duct and frame element walls.

11 Claims, 6 Drawing Sheets

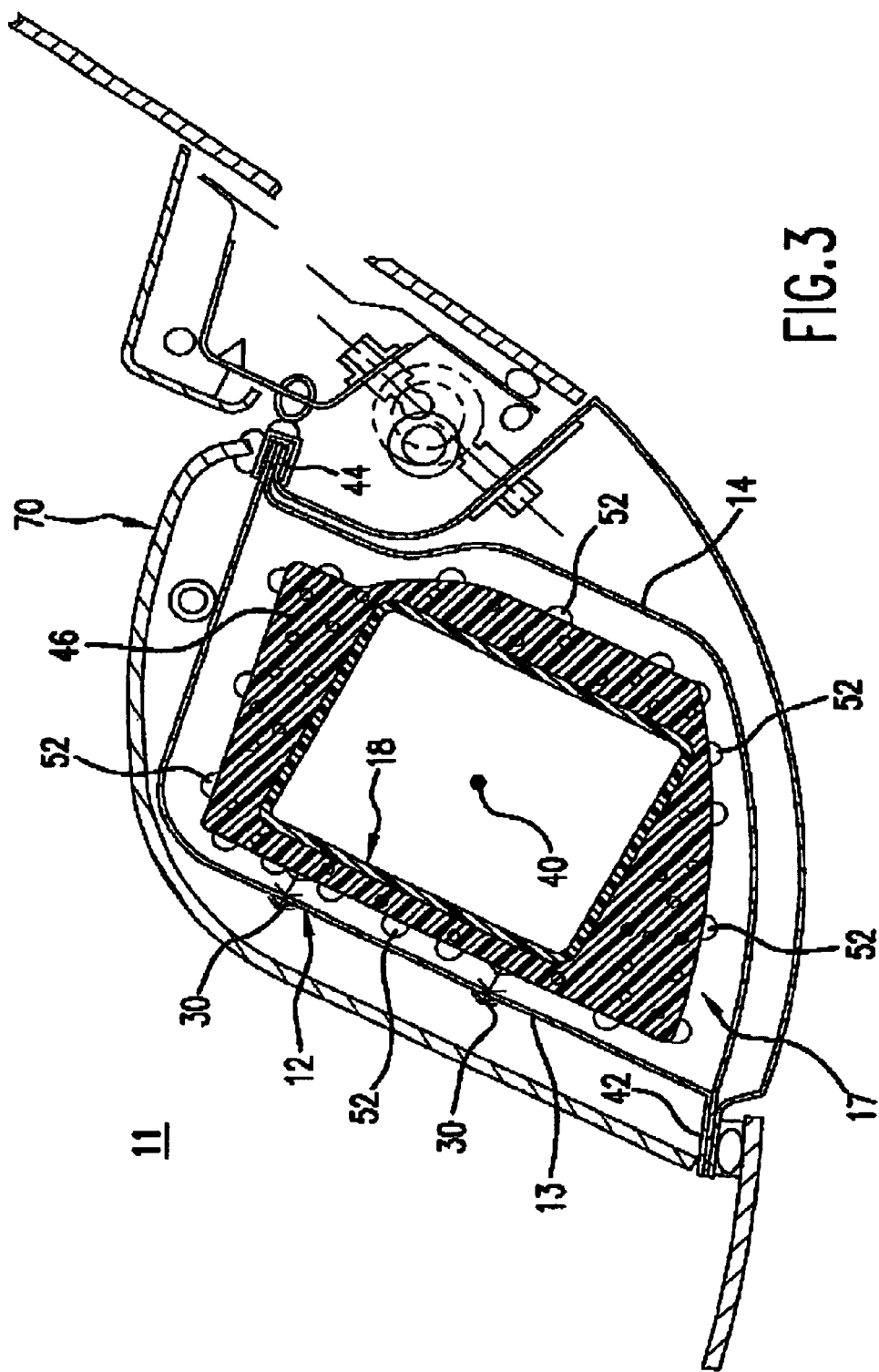

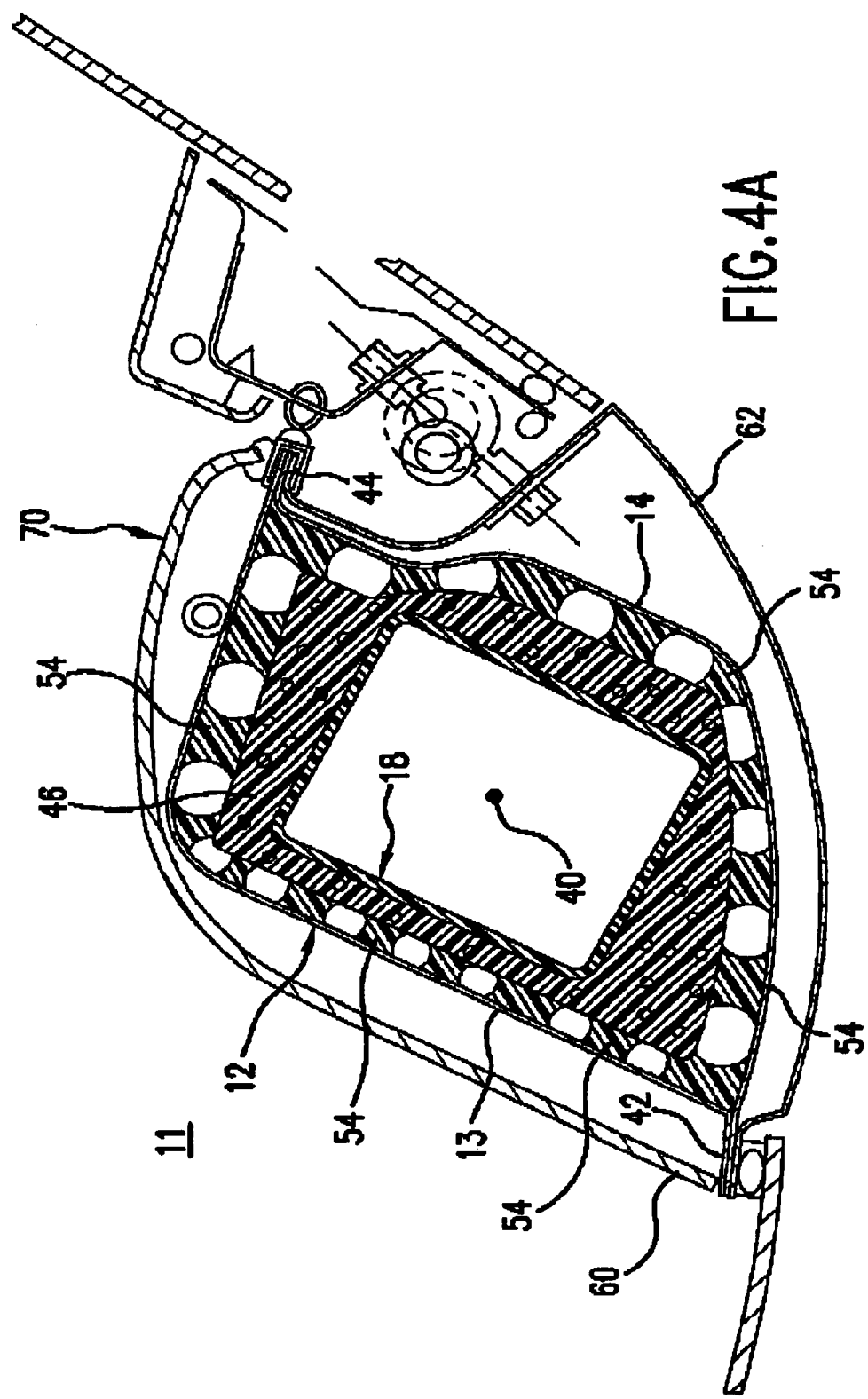

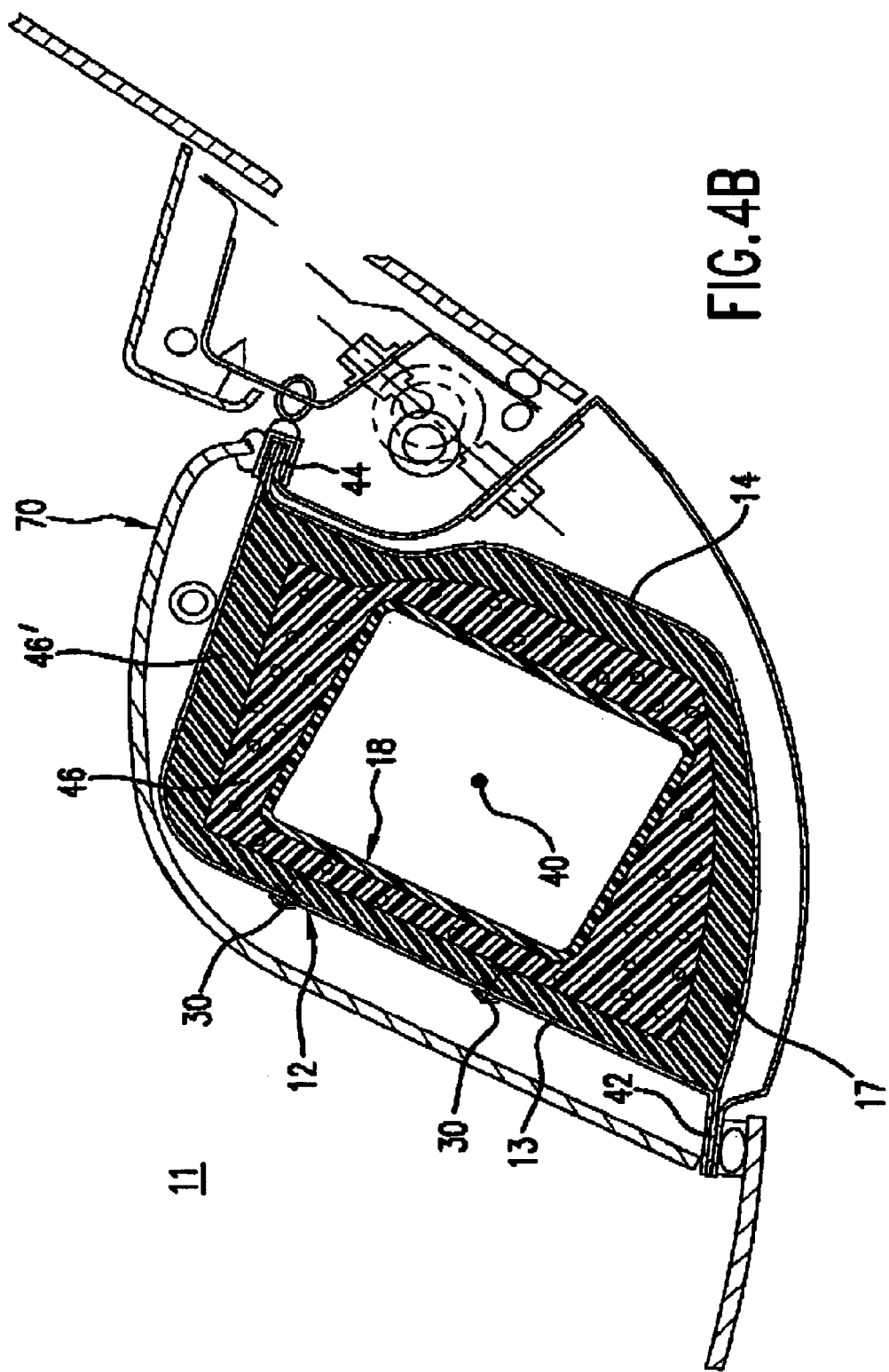

DUCT/FRAME ELEMENT ASSEMBLAGES AND METHODS OF ASSEMBLING DUCTS AND FRAME ELEMENTS

FIELD OF THE INVENTION

The present invention is directed to duct and frame element assemblages, as well as to methods of assembling ducts and frame elements. More particularly, the present invention is directed to HVAC duct and frame assemblages and to methods of assembling same, wherein a duct is assembled with a pillar element framing a passenger compartment of an automotive vehicle.

BACKGROUND OF THE INVENTION

Heating, ventilation and air conditioning (HVAC) systems are provided in automotive vehicles to maintain comfortable environments within passenger compartments. HVAC systems include ducts for supplying air to passenger compartments through openings in the ducts to various stations in the passenger compartments. In vehicles such as vans, station wagons and suvs in which rear seats are provided for three or four additional passengers, it is desirable to provide additional conditioned air for the rear seats.

According to current practice, a rear-most pillar, known in the art as the "D pillar," is used as a support for a HVAC duct that transmits vent or processed air to rear areas of the passenger compartment. In large suvs auxiliary HVAC systems are used for this purpose, and are offered by manufacturers as either standard or optional equipment in order to provide cooling and heating to rear areas of vehicles. In order to provide desired cooling air flow patterns, chilled air is moved toward the roofs of these vehicles through ducts that run up either "C pillars", located in front of the rear wheel wells of the vehicles, or up "D pillars", located behind the rear wheel wells. Currently, this type of duct is mounted adjacent to the outside surface of the pillar, which reduces space within the passenger compartment of the vehicle. Since it is not desirable to decrease the cross-sectional area of either the duct or pillar, there is a need to provide an arrangement for HVAC duct and D pillar assemblages that reduces space consumed by the assemblages while maintaining cross-sectional areas of ducts and pillars. Such needs extend to other duct and frame member assemblages of vehicles in general.

SUMMARY OF THE INVENTION

In view of the aforementioned considerations, the present invention is directed to a duct and vehicular frame member assemblage comprising a hollow vehicular frame member having a wall defining an axially extending space with lateral openings through the frame member. A duct extends co-axially in the space, the duct having openings aligned with the lateral openings and the duct being covered by a layer of structural foam which is bonded to the wall of the hollow vehicular frame member.

In a further aspect of the invention, the layer of structural foam is bonded to the vehicular wall member by heat-expanded epoxy.

In still a further aspect of the invention the vehicular frame member is a pillar and the duct is an HVAC duct.

The invention is also directed to a method of making the duct and vehicular frame member assemblage by providing a vehicular frame member having a wall defining a hollow, axially extending space with openings therethrough at axially spaced locations, and also providing a duct having inlet and outlet openings, the duct being covered with a layer of structural foam. The method further comprises disposing heat expandable adhesive between the structural foam and wall of the vehicular frame member; and thereafter retaining the duct within the axially extending hollow space of the vehicle frame member with the inlet and outlet of the duct aligned with the openings through the wall of the vehicular frame member. The heat expandable adhesive is then expanded by heating the vehicular frame member to bond the heat expandable adhesive to the wall of vehicular frame member and to the structural foam member.

In a further aspect of the method, heating occurs during baking of the vehicle frame member after painting the vehicular frame member.

In still another aspect of the invention, the vehicular frame member is adapted to be positioned in a vehicle between a passenger cabin of the vehicle and external body structure of the vehicle, the wall of the vehicular frame member having an interior wall portion and an exterior wall portion with openings through the interior and exterior wall portions, wherein the duct is attached to the interior wall portion, and thereafter the exterior wall portion is welded to the interior wall portion for defining the axially extending space and enclosing the duct therein.

In an additional aspect of the invention, the vehicular frame member is a rear pillar that is part of the frame enclosing the passenger compartment of the vehicle.

The invention is also directed to a method of making a duct and vehicular frame member assembly by providing a vehicular frame member with a wall defining a hollow axially extending space with openings through the wall at locations spaced from one another, and by providing a duct having inlet and outlet openings, the duct being covered with a layer of a cellular structure. In accordance with the method, a heat expandable adhesive is disposed between the cellular structure and the wall of the vehicular frame member. The duct is inserted within the axially extending hollow space of the vehicular frame member with the inlet and outlet of the duct being aligned with the openings through the wall of the vehicular frame member. Thereafter, the heat expandable adhesive is expanded by heating the vehicular frame member to bond the heat expandable adhesive to the wall of the vehicular frame member.

In a further aspect of the invention heating of the vehicular frame member occurs during baking the vehicular frame member after painting the vehicular frame member.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 3 is an elevation taken along lines 3—3 of FIG. 2 showing the HVAC duct and pillar assemblage prior to being heated;

FIG. 4A is a view similar to FIG. 3 showing the HVAC duct and pillar assemblage subsequent to heating, according to a first embodiment of the invention;

FIG. 4B is a view similar to FIG. 4A showing the HVAC duct pillar assemblage subsequent to sealing according to a second embodiment of the invention.

DETAILED DESCRIPTION

Figure 1:
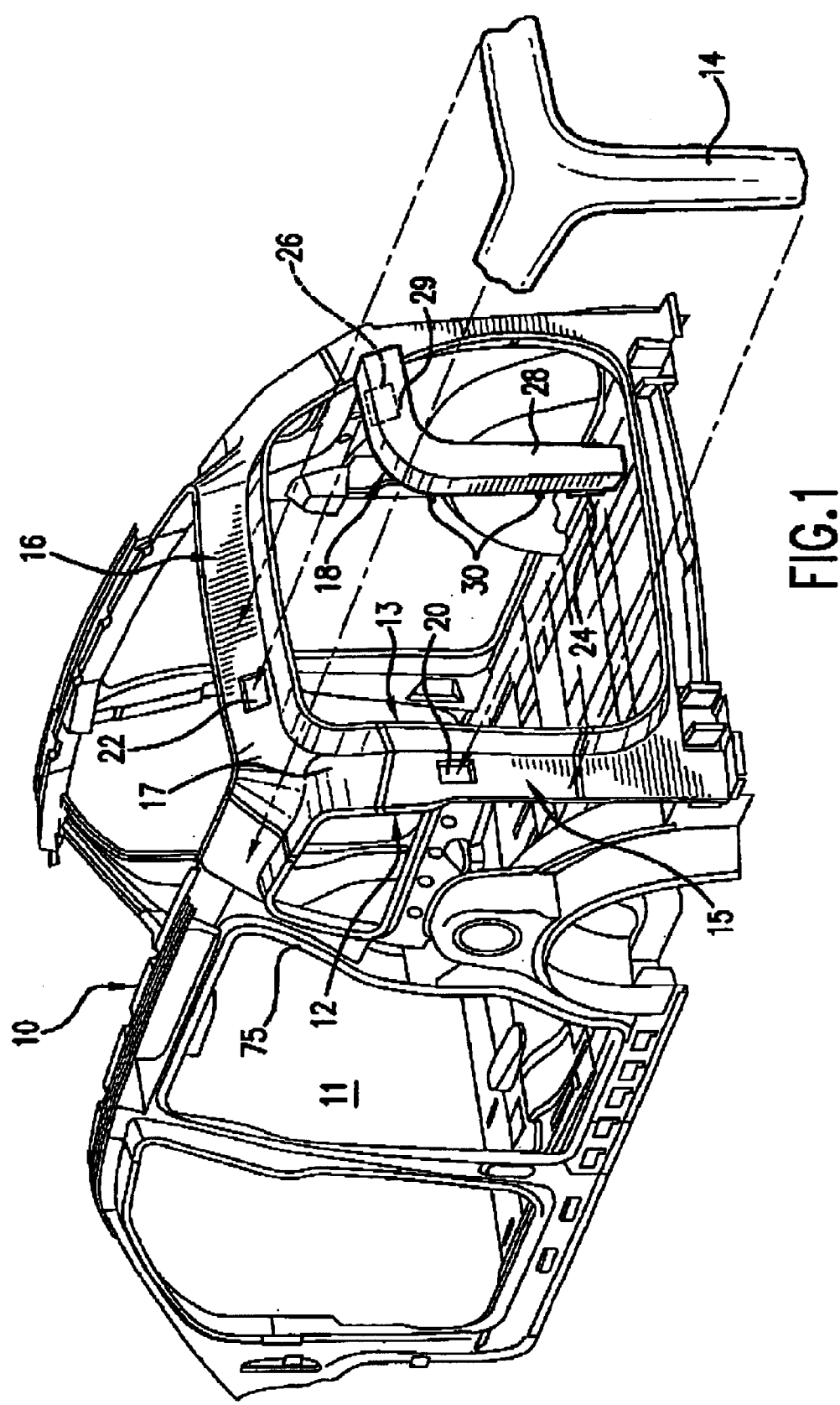
FIG. 1 is an exploded perspective view of a vehicle frame having a pillar within which an HVAC duct is to be mounted during assembly of the frame.

Referring now to FIG. 1 there is shown a frame 10 of a vehicle, such as a van, SUV or station wagon, wherein the frame 10 surrounds a passenger compartment 11 and is constructed and arranged to support exterior structure of the vehicle. As is evident in FIG. 1, the frame 10 includes several frame elements; such as a rear-most pillar 12 that has an inner wall portion 13 and an outer wall portion 14 (shown displaced from the inner wall portion prior to assembly with the inner wall portion). The rear-most pillar 12 has a left pillar portion 15 and a rear roof header 16, which when assembled with the outer wall portion 14 provides an axially extending space 17 for enclosing an HVAC duct 18 shown in FIG. 1 displaced from the inner wall portion 13.

The inner wall portion 13 of the rear most pillar 12 includes an inlet opening 20 and an outlet opening 22, which inlet and outlet openings align with an inlet 24 and an outlet 26 (shown in dotted lines), respectively, of the HVAC duct 18 when the HVAC duct is assembled with the rear-most pillar 12. When mounted on the inner wall portion 13 of the pillar 12, the HVAC duct 18 has generally vertical portion 28 and a generally horizontal portion 29 which conform with the vertical section 15 and the rear roof header 16, respectively.

During assembly, the HVAC duct 18 is retained on the inner wall portion 13 of the rear-most pillar 12 by clips 30 such as, for example, Christmas tree clips. After the outer wall portion 14 is aligned with and welded to the inner wall portion 13, the HVAC duct 18 is enclosed within the hollow space 17 defined by the wall portions 13 and 14 as is seen in FIGS. 2–4.

Figure 2:
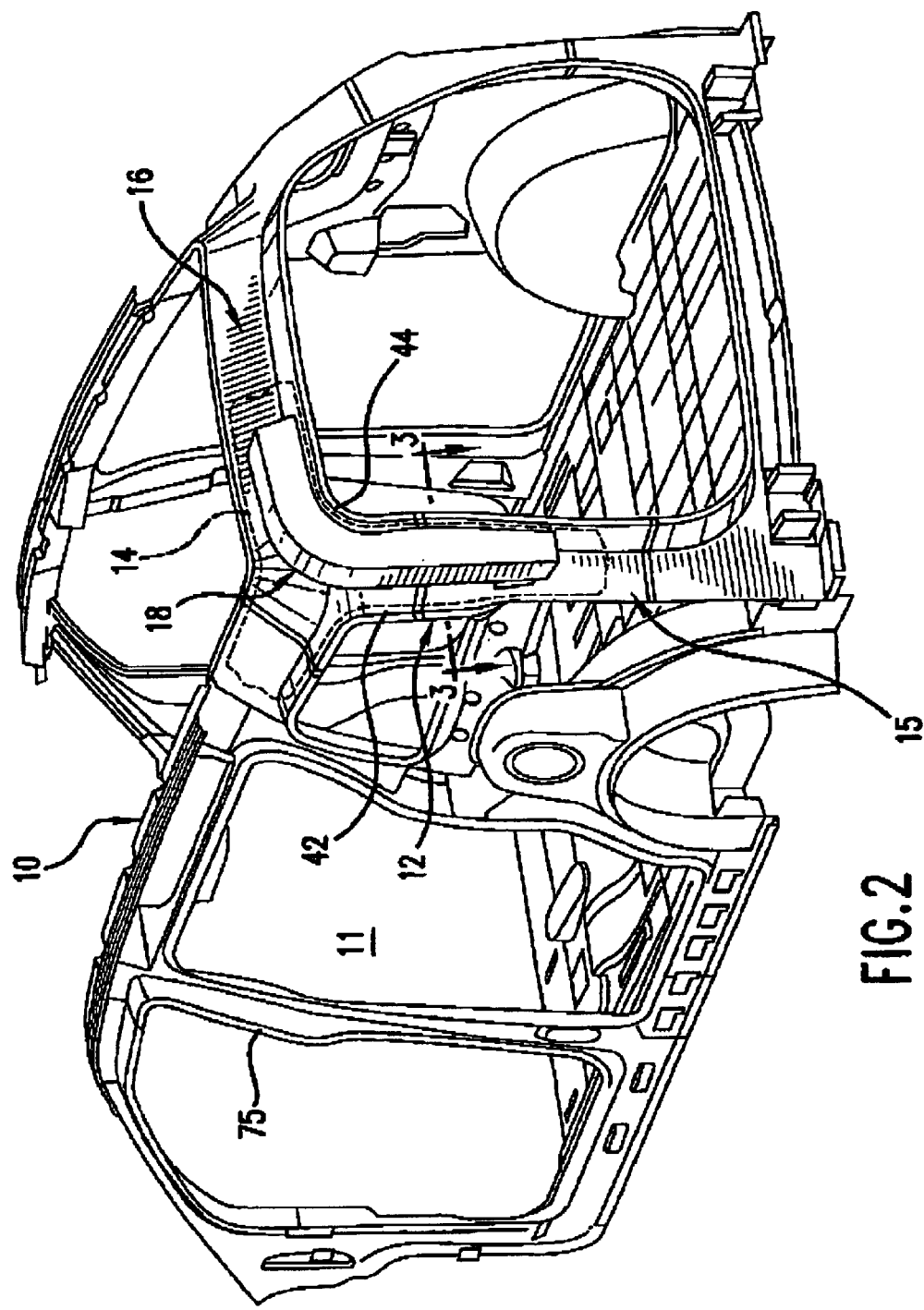
FIG. 2 is a perspective view of the vehicle frame of FIG. 1 with the HVAC duct inserted therein.

As is evident from FIGS. 1 and 2, the HVAC duct 18 is inserted into the rear-most pillar 12 during assembly of the vehicle frame 10 after the inner wall portion 13 of the rear-most pillar are assembled and prior to welding the outer wall portion 14 (shown in dotted lines in FIG. 2) to the inner wall portion. After the HVAC duct 18 is in place on the interior wall 13 and covered by the exterior wall section wall 14, and subsequent to painting the frame 10, heat is applied to the frame to bake the paint. Since the HVAC duct 18 must withstand heat due to baking, the HVAC duct is made from heat resistant material, such as but not limited to, NYLON® (polyamide).

Referring now to FIG. 3, the HVAC duct 18 is shown positioned within the axially extending space 17 of the rear most pillar 12 comprising a frame element of the frame 10. As is seen in FIG. 3, the HVAC duct 18 is generally rectangular in cross-section and is coaxial with an axis 40 of the space 17, which axis is substantially L-shaped to conform to the shape of the vertical pillar portion 15 and rear roof header 16 (see FIGS. 1 and 2). The inner wall portion 13 and the outer wall portion 14 are welded together at peripheral areas 42 and 44 to form the rear-most pillar 12.

The HVAC duct 18 is covered by panels 46 of structural foam or other cellular structures such as, but not limited to, honey comb panels. As previously stated, the Christmas-tree clips 30 retain the HVAC duct 18 on the inner wall 13 prior to welding the outer wall 14 to the inner wall 13 at the two flange locations 42 and 44. The panels 46 of structural foam partially fill the gap in the space 50 between the inner surfaces of interior and exterior walls 13 and 14. In a preferred embodiment, the geometry of structural foam's cross section complements the geometry of the interior and exterior walls 13 and 14 of the pillar 12. The materials for the structural foam panels 46 include, but are not limited to, polyurethane, high density polyethylene, high impact polystyrene, polypropylene, and engineering resins such as polycarbonate, modified polyphenylene oxide (also blends with polystyrene) and acrylonitrile-butatiene-styrene copolymer. Since these materials are subject to elevated temperatures during the paint baking step, plastics which withstand higher temperatures are likely preferable, such as but not limited to, polycarbonate, thermoplastic polyester and polyamide. A preferable material is BETAFOAM®, which is polyurethane foam available from Dow Automotive of Auburn Hills, Mich.

In accordance with an alternative embodiment of the invention, a two-part polyrethane foam such as BETAFOAM® is injected into space 17 where it cures in place between the duct 18 and the inner surface of walls 13 and 14, adhering to both the duct and the inner surfaces.

According to a first embodiment of the invention, the structural foam 46 covering the HVAC duct 18 has deposits 52 of heat expandable epoxy at locations thereon that adhere with inner surfaces of the wall portions 13 and 14 upon heating the rear most pillar 12. While the heat expandable epoxy 52 is shown as spaced patches on the surface of the structural foam member 46, the epoxy can also be coated over substantial portions or the entire outer surface of the structural foam 46. Alternatively, the heat expandable epoxy 52 is coated on the inner surfaces of inner and outer walls 13 and 14 of the pillar 12 and expands toward the structural foam 46. The starting material for most epoxies, including heat expandable epoxies, is epichiorohydrin. Suitable epoxy resins include those that have at least two oxirane groups such as epoxy novalak resins obtained by reacting epichlorohydrin with phenol/formaldehyde condensates or cresol/formaldehyde condensates. Another preferred epoxy resin is polyglycidyl ether polymers obtained by reaction of epichlorohydrin with a polyhydroxy monomer such as 1,4 butanediol. A specific example of suitable epoxy novolak resin is Epon 164 available from Shell Chemical Company. A specific example of the polyglycidyl ether is available from Ciba-Geigy Corporation under the trade name ARALDITE® GT 7013. The epoxy resins are preferably employed with a cross linker which activates upon exposure to heat. Preferred cross linkers include polyamines with at least two primary or secondary amine groups. Examples of such adhesives are Epi-cure P101 and Ancamine 2014FG available from Shell Chemical Company and Air Products Company, respectively. Accelerators such as triglycidylisocyanurate can be used with the cross linker to accelerate the reaction. Another example is a one part expandable adhesive, BETAMATE®, available from Dow Automotive of Auburn Hills, Mich.

FIG. 4A directed to a first embodiment of the invention, once the epoxy 52 expands, it assumes the structure 54, fills the gap 17 and engages the inner surfaces of the walls 13 and 14, the structural foam 46 adheres to the inner surfaces of walls 13 and 14. This stabilizes the framing element formed by the walls 13 and 14 of the pillar 12 by promoting membrane stress as opposed to sheet stress in the metal of the pillar. Improving load carrying capacity while buckling resistance arid stiffness is increased enhances the efficiency of the pillar 12.

As is seen in FIG. 4B where a second embodiment of the invention is shown, the structural foam is an expandable foam 46' which in accordance with an alternative embodiment of the invention, a two-part polyurethane foam such as BETAFOAM® is injected into the space 17 where it cures in place between the duct 18 and the inner surfaces of walls 13 and 14, adhering to both the duct and inner surfaces. Exemplary of such a foam 46' is a two-part polyurethane foam such as BETAFOAM®.

During further assembly, interior trim 60 is fixed on the frame 10 to extend over the interior wall section 13 of the pillar 12, and exterior body structure 62 is fixed on the frame to extend over the exterior wall section 14 of the pillar.

Figure 5:
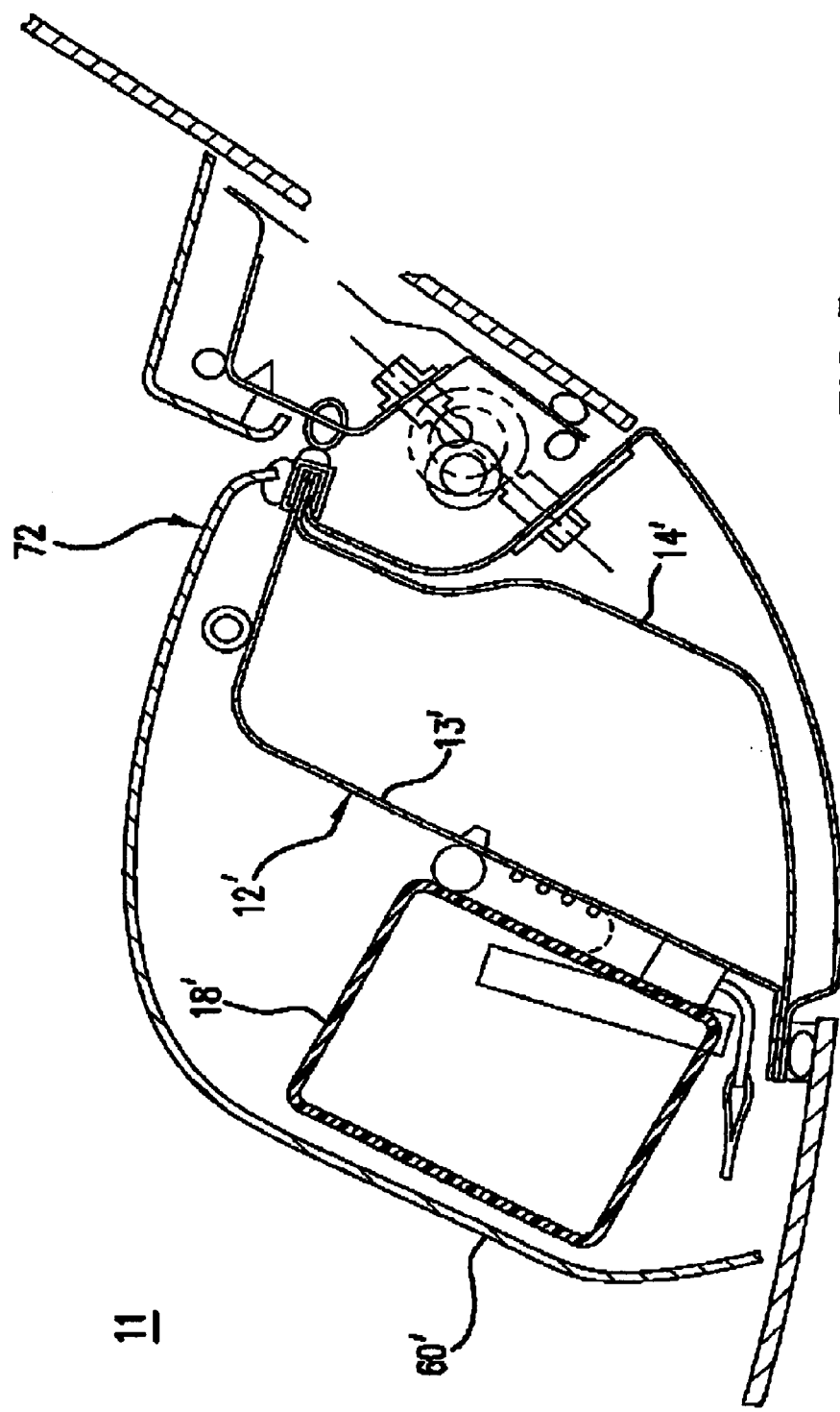
FIG. 5 is an elevation of a prior art HVAC duct and pillar assemblage.

Upon comparing FIG. 4 of the present invention with FIG. 5 illustrating the prior art, a number of differences become apparent. In FIG. 4 the HVAC duct and pillar assembly 70 does not intrude into the passenger compartment 11 to the extent that the HVAC duct assembly 72 of the prior art intrudes. In addition, the cross-sectional area enclosed by the rear most pillar 12 of FIG. 4 is larger than the cross-sectional area enclosed by the pillar prior art 12' of FIG. 5. Consequently, the noise and vibration requirements for a first structure mode frequency are met by having a larger section size for the pillar 12.

While the duct 18 is shown installed within a D pillar 12 of a vehicle, the same concepts are applicable when installing a duct within the C pillar 75 of the vehicle, or when installing a duct within another frame element of any vehicle. While the duct 18 is useful for conveying HVAC air within a vehicle, the duct is also useful for running wire, cable or fluid lines through portions of a frame or chassis of a vehicle.

From the foregoing description, one skilled in the art can easily ascertain the essential characteristics of this invention, and without departing form the spirit and scope thereof, can make various changes and modifications of the invention to adapt it to various usages and conditions.

What is claimed is:

1. An HVAC duct and pillar assembly for an automotive vehicle comprising:
   a pillar having a vertically extending section and a horizontally extending section, the pillar having a wall defining a hollow space extending axially therein, the hollow space communicating with a first opening through the vertical section and a second opening through the horizontal section;
   an HVAC duct disposed within the hollow space and extending between the first and second openings through the pillar, the duct having an air inlet aligned with the first opening and an air outlet aligned with the second opening;
   a layer of a cellular structure disposed between the duct and the wall of the pillar, and
   expandable adhesive between the cellular structure and the wall for bonding the cellular structure to the wall.

2. The HVAC duct and pillar assembly according to claim 1 wherein the duct is made of polyamide and the wall of the pillar is made of sheet metal.

3. The HVAC duct and pillar assembly according to claim 2 wherein the sheet metal is steel.

4. The HVAC duct and pillar assembly according to claim 3 wherein interior trim is disposed adjacent to an interior wall portion of the wall of the pillar and body structure is disposed adjacent to an exterior wall portion of the wall of the pillar.

5. The HVAC duct and pillar assembly according to claim 1 wherein the cellular structure is structural foam.

6. A rear HVAC duct and pillar assembly for an automotive vehicle, wherein the assembly has reduced space consumption with increased cross-sectional area enclosed by the pillar, comprising:
   a pillar having a vertically extending section and a horizontally extending section, the pillar having a wall defining a hollow space extending axially therein, the hollow space communicating with a first opening through the vertical section and a second opening through the horizontal section;
   an HVAC duct disposed within the hollow space and extending between the first and second openings through the pillar, the duct having an air inlet aligned with the first opening and an air outlet aligned with the second opening;
   a layer of a cellular structure disposed between the duct and the wall of the pillar, and
   expandable adhesive between the cellular structure and the wall for bonding the cellular structure to the wall wherein the cross-sectional area of the pillar is increased while reducing the space consumption of the assembly to meet noise and vibration requirement for a first structure mode by having a larger section size for the rear pillar.

7. The HVAC duct and pillar assembly according to claim 6 wherein the duct is made of polyamide and the wall of the pillar is made of sheet metal.

8. The HVAC duct and pillar assembly according to claim 7 wherein the sheet metal is steel.

9. The rear HVAC duct and pillar assembly according to claim 8 wherein interior trim is disposed adjacent to an interior wall portion of the wall of the pillar and body structure is disposed adjacent to an exterior wall portion of the wall of the pillar.

10. The HVAC duct and pillar assembly according to claim 6 wherein the cellular structure is structural foam.

11. The HVAC duct and pillar assembly of claim 1 wherein the pillar is a rear pillar.

* * * * *